Feb. 12, 1952  R. A. WARNER  2,585,707
HALL EFFECT ALTERNATING CURRENT VOLT-AMPERE METER
Filed Dec. 29, 1950  2 SHEETS—SHEET 1

Inventor:
Russell A. Warner,
by Russell A. Warner
His Attorney.

Feb. 12, 1952 R. A. WARNER 2,585,707
HALL EFFECT ALTERNATING CURRENT VOLT-AMPERE METER
Filed Dec. 29, 1950 2 SHEETS—SHEET 2

Inventor:
Russell A. Warner,
by Russell A. Warner
His Attorney.

Patented Feb. 12, 1952

2,585,707

UNITED STATES PATENT OFFICE 2,585,707

HALL EFFECT ALTERNATING CURRENT VOLT-AMPERE METER

Russell A. Warner, Schenectady, N. Y., assignor to General Electric Company, a corporation of New York Application December 29, 1950, Serial No. 203,322

6 Claims. (Cl. 171—95)

My invention relates to the measurement of alternating current volt-amperes, and its object is to provide relatively inexpensive, simple apparatus for this purpose having good accuracy. In carrying my invention into effect, I energize the field and current input terminals of a Hall plate in proportion to the voltage and current components of the volt-amperes to be measured, at least one of said components being rectified. The Hall plate output is then proportional to volt-amperes and is independent of the phase angle between the voltage and current components.

Figure 1:
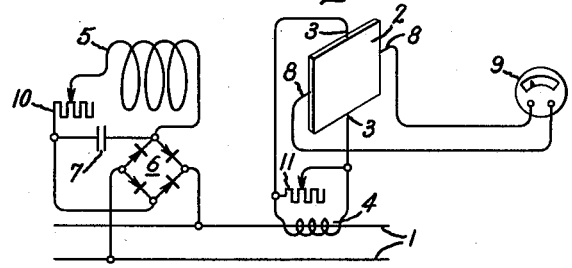
Figure 2:
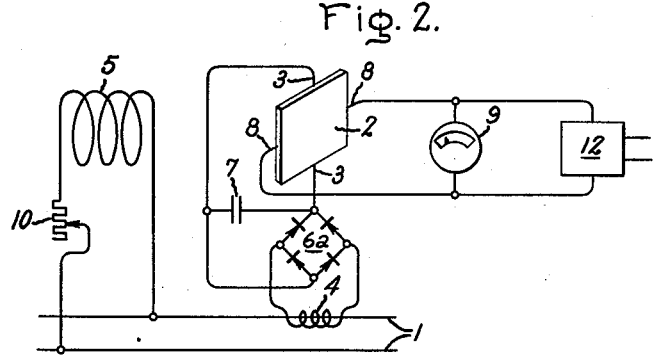
Figure 3:
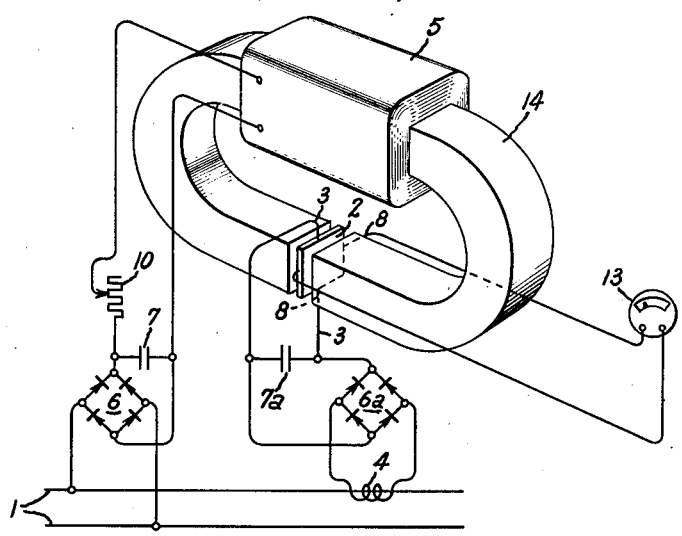
Figure 4:
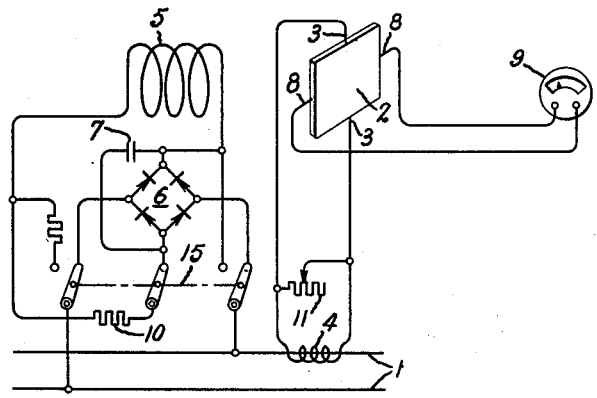
Figure 5:
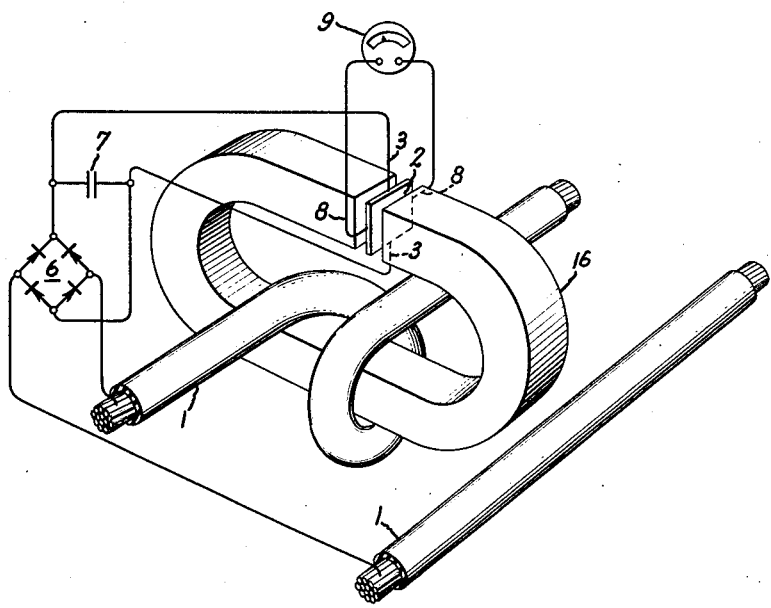

The features of my invention which are believed to be novel and patentable will be pointed out in the claims appended hereto. For a better understanding of my invention, reference is made in the following description to the accompanying drawings in which Fig. 1 represents an embodiment of my invention where the voltage component is rectified. Fig. 2 represents an embodiment of my invention where the current component is rectified. In Figs. 1 and 2 the output of the Hall plate will be an alternating current voltage. By rectifying both of the input components to the Hall plate as represented in Fig. 3, the Hall plate output will be a direct current voltage. Fig. 4 represents the apparatus of Fig. 1 with switching means to convert the apparatus to a wattmeter, and Fig. 5 shows how the line current transformer and Hall plate magnetic field may be combined.

Referring to Fig. 1, I represents an alternating current power circuit. A rectangular Hall plate 2 has current input terminals 3 at the centers of opposite edges, which terminals are supplied by alternating current either directly or through a current transformer 4 from line I in proportion to the load current flowing in such line. A coil 5 for producing a field through the Hall plate at right angles to its surface is supplied by direct current through a full-wave rectifier 6 connected across the line I, and hence, the field 5 is energized in proportion to the voltage of line I. Preferably, a condenser 7 is connected across the field coil to smooth the rectified current pulsations. The Hall plate 2 is provided with output terminals 8 at the centers of the other opposite edges and these output terminals are connected to an alternating current measuring instrument 9.

The Hall plate 2 may be made of germanium or some other material which exhibits the Hall effect to a high degree. As is known, a Hall plate energized by a field and input current as described will produce a voltage across its output terminals 8 which is proportional to the instantaneous produce of field flux and input current. The output voltage will be alternating if one of the input circuits is energized by alternating current and the other is energized by direct current. Hence, in Fig. 1, the alternating current voltmeter 9 will be energized in proportion to the volt-amperes of the power circuit I and may be calibrated accordingly. To assist in calibration and to proportion the energizing currents to those best suited for a particular installation, I may provide adjustable resistances in series with the coil 5 as at 10 and in shunt to the current transformer secondary 4 as at 11. Such resistances may furthermore have such temperature coefficients of resistance as to compensate for any temperature errors that may be present in the operation of the apparatus.

In Fig. 2 the current component of the power circuit is rectified instead of the voltage component. The schemes of Figs. 1 or 2 will in most cases be used where it is desirable to make use of a control amplifier in the Hall plate output circuit for any reason, since alternating current amplification is generally to be preferred over direct current amplification for most purposes. Thus, 12 in Fig. 2 may represent an alternating current amplifier. In cases where amplification is not contemplated in the output circuit and the use of the more sensitive direct current indicating instrument is preferred, I may rectify both the voltage and current components which feed the Hall plate as represented in Fig. 3 where 6 represents the full-wave rectifier for the voltage component supplying the field coil 5, and 6a the full-wave rectifier for the current component supplying the input terminals 3 of the Hall plate. In this case the output of the Hall plate will be direct current proportional to volt-amperes, and hence, a sensitive direct current instrument 13 will be connected across the output circuit and calibrated with the apparatus in terms of volt-amperes of the power circuit I.

In all cases a magnetic circuit 14 such as represented in Fig. 3 will be used for the field to obtain good efficiency. The Hall plate 3 is contained in a relatively narrow air gap in such magnetic field flux circuit.

In the illustrations thus far explained the voltage component supplies the field, and the current component supplies the input terminal of the Hall plate, but it will be evident to those skilled in the art that the reverse arrangement may be used.

In all cases the effect of phase angle between the current and voltage components is eliminated because of the rectification of one or both of such components, and hence, the Hall plate output is proportional to volt-amperes, but the latter may be either a direct or alternating current voltage. It will be evident that if neither component were rectified before energizing the Hall plate, the effect of phase angle between these components would not be eliminated in the Hall plate output, and hence, rectification of at least one of the components is essential.

The apparatus of the invention may, however, be used to measure A. C. watts by a slight change in connections as represented in Fig. 4 where the apparatus of Fig. 1 is shown equipped with a switch 15 for connecting the field 5 through the rectifier 6 or directly to the line 1. In the position of the switch 15 shown, the apparatus is connected as in Fig. 1 for the measurement of volt-amperes. When the switch is thrown to the left, the rectifier 6 with the condenser 7 across it is cut out and the field 5 is connected directly to line 1. As thus connected, the Hall plate output will be sensitive to the phase angle between the current and voltage components, and the alternating instruments 9 may have a second scale calibrated with the last-mentioned connection for the measurement of the alternating current watts of line 1. With such connection the Hall plate output voltage will be proportional to the product of the inphase components of current and voltage of line 1 instead of to the product of current and voltage. No claim is made for the measurement of watts per se, as this is not my invention.

Where a single rectifier circuit is used and is in the voltage supply circuit to the Hall plate input current terminals, it is possible to combine the field core structure for the Hall plate with the line current transformer as represented in Fig. 5. Here, the Hall plate field structure is represented at 16, and the field winding simply consists of one or more turns of one of the line conductors 1 threaded through such core structure.

What I claim as new and desire to secure by Letters Patent of the United States is:

1. Apparatus for measuring the volt-amperes of an alternating current line comprising a Hall plate having a field winding for producing a flux therethrough and having input current terminals at opposite edges across one central axis of said plate and output voltage terminals at other opposite edges across a central axis at approximately right angles to the first mentioned axis, circuits for supplying the field and the current input terminals from the line the volt-amperes of which are to be measured, one of said circuits being supplied in proportion to the voltage of said line and the other circuit being supplied in proportion to the current of said line, means in at least one of said supply circuits for rectifying the current flow therein, and an instrument supplied from the output voltage terminals of said Hall plate calibrated with the apparatus in terms of the volt-amperes of said line.

2. Apparatus as claimed in claim 1, characterized by the fact that the field winding is supplied through a rectifier circuit in proportion to the voltage of the line, and the current input terminals of the Hall plate are supplied by alternating current proportional to the line current.

3. Apparatus as claimed in claim 1, characterized by the fact that the field winding is supplied by alternating current proportional to line voltage, and the current input terminals of the Hall plate are supplied in proportion to the line current through a rectifier circuit.

4. Apparatus as claimed in claim 1, characterized by the fact that both the field winding and current input terminals of the Hall plate are supplied through rectifier circuits, and the instrument which is supplied from the output terminals is a direct current instrument.

5. Apparatus for measuring the volt-amperes of an alternating current line comprising a Hall plate, a field winding for producing a flux through said plate, current input and voltage output terminals on said plate, circuits for supplying the field winding and current input terminals from the line the volt-amperes of which are to be measured, one circuit being supplied in proportion to the voltage of said line and the other circuit being supplied in proportion to the current in said line, rectifier means connected in only one of said supply circuits, a condenser connected across said rectifier means, a measuring instrument supplied from the output terminals of said Hall plate and having a scale calibrated with said apparatus in terms of the volt-amperes of said line, and switching means asscoiated with the rectifier supply circuit having a first position where said rectifier means with the condenser connected thereacross is included in such energizing circuit and a second position where said rectifier means with the condenser connected thereacross is eliminated from said supply circuit, whereby with the switching means in the second position the output of said Hall plate becomes proportional to the watts of said line, said instrument having a second scale calibrated with the apparatus, when said switching means is in said second position, in terms of the watts of said line.

6. Apparatus as claimed in claim 1, characterized by the fact that rectifier means is included in only the voltage supply circuit to the Hall plate input terminals, and that the field winding is on a magnetic core containing an air gap in which the Hall plate is located and consists of one or more turns of the line conductor threaded through such core.

RUSSELL A. WARNER.

REFERENCES CITED

The following references are of record in the file of this patent:

UNITED STATES PATENTS

| Number | Name | Date |
|---|---|---|
| 2,550,492 | Millar | Apr. 24, 1951 |